Feb. 14, 1928.
M. L. NELSON
1,659,045
AUTOMATIC BATTERY CHARGING SYSTEM
Filed Dec. 15, 1924
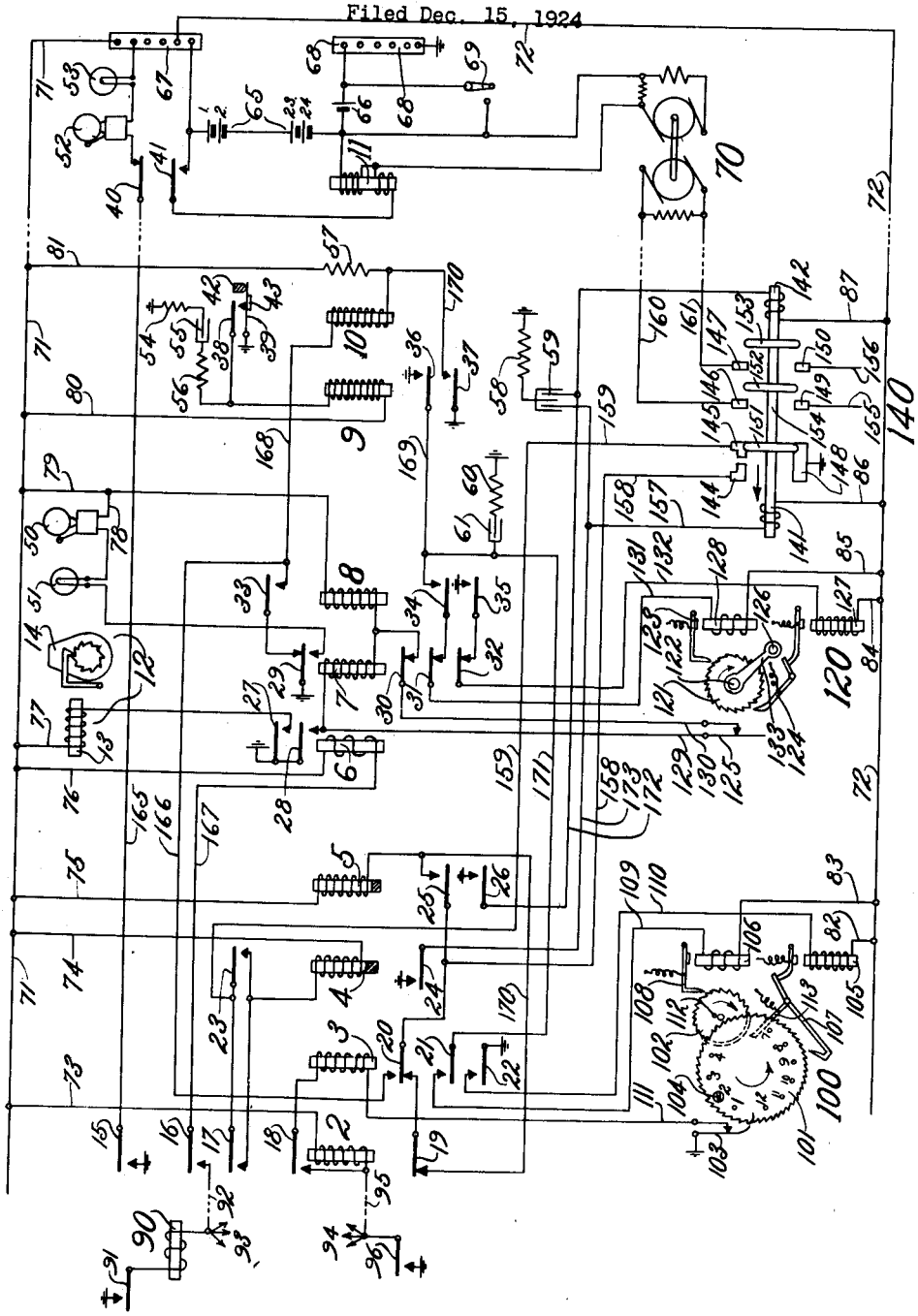
Inventor
Martin L. Nelson
Wm Walter Owens Atty.

Patented Feb. 14, 1928.

1,659,045

UNITED STATES PATENT OFFICE.

MARTIN L. NELSON, OF PARK RIDGE, ILLINOIS, ASSIGNOR, BY MESNE ASSIGNMENTS, TO AUTOMATIC ELECTRIC INC., OF CHICAGO, ILLINOIS, A CORPORATION OF DELAWARE.

AUTOMATIC BATTERY-CHARGING SYSTEM.

Application filed December 15, 1924. Serial No. 755,836.

The present invention relates in general to automatic battery charging systems, and the object of the invention, broadly stated, is to produce a new and improved system of this character operating on novel principles and possessing numerous advantages not found in prior systems.

The principal object of the invention involves provisions of means in a battery charging system which permit the use of a very small battery. To be more specific, it is desired to use the battery under normal conditions only for starting the machine and for afterwards damping out audio-frequency currents emanating from the generator. The current, however, required by the equipment drawing current from the battery, which in the example illustrating my invention is assumed to be a telephone exchange, is supplied entirely by the generator, and the battery is being charged whenever the generator is running to keep it at its normal capacity.

In attaining the foregoing object, I use a battery floating scheme which differs from that usually employed in telephone exchanges in that I do not have a fixed floating or charging current, but a fixed open circuit generator voltage which is preferably two volts higher than the maximum voltage permissible on the switch-boards.

The reason for having a fixed voltage is to prevent the switch-board voltage becoming excessively high, during light traffic, without using a special voltage regulating equipment. One counter-cell with a back-pressure of two volts is always in the discharge circuit, therefore, if the traffic is light and the battery becomes charged to a voltage equal to the generator voltage, the switch-board voltage, through the counter-cell, will be no higher than the maximum allowable.

If, for example, a range is allowed from 46 to 52 volts on the switch-board, with the counter-cell this means a range of 48 to 54 volts in the battery. If it is determined that the maximum load is 5 amperes, a machine will be used with an open circuit voltage of 54 volts, capable of delivering 5 amperes to the exchange when connected across a 48 volt battery, without drawing any current from the battery. This automatically keeps the switch-board voltage between 46 and 52 volts and eliminates special voltage regulating means.

The generator voltage two volts higher than the maximum permissible voltage on the switch-board, and a counter-cell to reduce the voltage in the discharge circuit, have been adopted in order to keep the battery fully charged and to provide for a reserve of full 24 cells in case of machine failure. The life of the battery is thereby increased and the necessity of frequent overcharging eliminated.

To explain this further, if the generator voltage would be lowered by two volts, and the counter-cell omitted, the voltage in the battery would be lower than is desirable, as it is known that the life of a battery is increased if the voltage of a cell is kept at about 2.1 volts and not lower than two volts.

The same result could of course be obtained by dropping the generator voltage two volts, omitting the counter-cell, and removing also one active cell. But if this were done, the failure of the machine or the commercial current source would leave only 23 cells as a reserve. When 24 cells are used, the counter-cell can be shunted in case of emergency and full 24 cells are available.

The generator should preferably be a compound wound machine. A shunt wound generator could of course be used also, but the voltage drop which takes place by using this type makes it undesirable. The generator should be under-compounded enough to give a drop of 3 volts between full charge and no charge in order to prevent excessive charging when connected up with an almost discharged battery.

Another object relates to a signal arrangement which operates in case of machine failure to call the attention of the office attendant. The counter-cell which is normally in the discharge circuit will be shunted in this case through a manually operable switch, and the switch-board load carried by the battery.

Another object relates to a signal arrangement which operates in case of a faulty release circuit in one of the switches in the exchange. To explain this further, the alarm signal operates and calls the attention of the office attendant if one of the release magnets of the switches should not operate properly and remain connected to current for an undue period exceeding a certain maximum predetermined time. An adjustable timing device starts to operate simultaneously with the release magnet, and, if the normal conditions are not restored within a certain time, the alarm signal is connected up. If the fault occurs late in the evening, after the attendant has left the office, current will be disconnected from all the release circuits in the exchange, a certain time after the last call is finished, and the faulty release current will be signalled a few seconds after the first call in the morning.

A further object of my invention resides in means to produce a delayed charge cut off through the medium of an automatic timing device for controlling the motor circuit of the motor-generator. The motor will be stopped only if a certain predetermined time has elapsed during which no current is required at the switchboards. This period of time is determined by the peculiar local conditions and may range from a few minutes to one hour.

It will be advisable to enter into a short discussion concerning this last mentioned object, before proceeding with the description.

At any place where intermittent current is required, as for example in a telephone exchange, it is desirable to disconnect the battery charging means during the periods of silence. Automatic battery charging systems have been devised for this purpose, which start the motor of the motor generator, or other equipment for charging the battery, in response to the initiation of a call, or, more particularly, responsive to certain relay operations following the removal of the receiver by a calling subscriber, and disconnect them again after the call is finished provided no other call is present. Thus, if depending solely on the presence of a call, the machine is bound to start and to stop many times during the day, which is not only a burden on the machine, but consumes a considerable amount of current due to the frequent starts.

Periods of silence occur, as every one experienced in the art knows, quite frequently in a small telephone exchange. However, their duration varies greatly and may range from one second during the peak hour up to one-half hour and more during noontime. In consideration of these conditions, it is advisable to provide for automatic battery charging means capable of discriminating between a desirable and non-desirable stop of the motor-generator. In other words, means that actuate the charge cut-off only after a certain predetermined time has elapsed during which no call was made.

It is obvious that the provision of a delayed charge cut-off is especially advantageous in connection with a battery charging system of the character herein explained. which uses only a very small battery. The current drawn from the battery in starting the machine is being replaced in periods of silence which are too short to make a disconnection of the battery charging means economical.

From the foregoing it will be seen that my invention is concerned solely with an automatic battery charging system and delayed charge cut-off. It is, therefore, thought to be superfluous to show the switches involved in the extension of a call. Accordingly I have shown only those elements necessary for the understanding of the invention.

The stated objects and other features of the invention will be described and explained fully hereinafter, reference being had to the accompanying drawing forming a part of this specification.

Referring now to the single figure of the drawing. I have shown by means of conventional diagrams the manner of carrying out my invention.

At the left side of the drawing I have shown the part of switches of an automatic telephone exchange which is necessary for the comprehension of the invention. The release circuit comprises a release magnet 90 and a contact spring 91 and the initiating circuit is indicated through contact spring 96. This latter circuit will be closed whenever a subscriber originates a call. The distributing points 93 and 94 indicate the connections to other switches in the exchange. As long as a call is present, the circuit over conductor 95 will be closed, and the operation of a release magnet, such as 90, will complete a circuit over conductor 92.

At 100, I have shown a switching device comprising a motor magnet 106, a holding magnet 105, and two ratchet wheels 101 and 102. Contact 103 is adapted to be operated by means of a pin 104 mounted on the wheel 101. An interrupter device comprising the relays 9 and 10, which shall be described later, furnishes current impulses for intermittently operating the motor magnet 106. Assume the interrupter device to be adjusted to produce approximately 40 impulses per minute, the motor magnet 106, by means of the pawl 108, will rotate the ratchet wheel 102, which has forty teeth, in the direction indicated by the arrow. Thus, 102 will make one revolution per minute. Pin 112 which is mounted on wheel 102 is adapted to take hold in the teeth of wheel 101. The latter will therefore advance in the direction of the arrow at the rate of one step per minute and will move the pin 104 towards the contact spring 103. Wheel 101 is provided with twelve tapped holes, each apart from the other by five teeth,—that is, four teeth are skipped. The pin 104 may be positioned in any one of these holes. As one step of wheel 101 requires a full revolution of wheel 102 which consumes about one minute, it will take ten minutes to advance pin 104 to contact spring 103 if the pin 104 is located in the position in which it is shown in the drawing. The holding magnet 105 is kept energized during the operation of the switch to release the holding pawls 107 and 113 to allow them to engage the teeth of wheels 101 and 102 respectively. The operation of switch 100 starts after the last party hangs up the receiver and continues until pin 104 reaches contact 103. The operation of this contact causes the energization of the stop magnet 142 of a solenoid power switch 140 which then disconnects the battery charging means. If, while the switch is in operation, current is required again, i. e., according to the assumed conditions in a telephone exchange if a call is made during the operation of the delay switch 100, it will re-set itself automatically and must be started again with the next period of silence.

At 120, I have shown another switch similar in its construction to that just described. It serves for the actuation of an alarm signal comprising a bell 50 and lamp 51. This switch has only one ratchet wheel 121 which may be of the same dimensions as wheel 102 of the delay switch 100. The switch is shown in its normal position in which it is kept by means of a spring wound around shaft 122. A pin 126 is mounted on the periphery of wheel 121 or on a projecting lever 133 and adapted to operate contact spring 125. Whenever a release magnet, of which I have shown one and designated through the numeral 90, is being actuated, the switch 120 starts to operate and to advance pin 126 towards contact spring 125. Under normal conditions, the operation of a release magnet, for example magnet 90, is performed instantly after the operation of the controlling relay, and the release magnet 90 restores to normal. If, however, a fault occurs which would be detrimental to magnet 90, which manifests itself through permanent magnetization of the release magnet, an alarm must be given immediately. If such a fault is present, pin 126 operates contact 125 within a predetermined maximum time, say twelve seconds, and causes the operation of the alarm signal. If on the other hand the release operations of the switches are performed properly, switch 120 assumes its original position and the alarm is not operated. The probability that a number of release operations follow one another in succession so as to ultimately cover the whole period of twelve seconds, and consequently to cause the alarm signal to be operated, is a purely theoretical consideration, as approximately 70 succeeding release operations would be necessary for initiating such a false alarm.

Referring to the reference number 140, this is a circuit closing device of the solenoid type, having a winding at each end adapted to draw the bar 154, carrying the wipers 151, 152 and 153, forward and back to connect commercial current to the motor of the motor generator 70 and also to prepare the circuits of its own two windings. That is, in its normal position as shown in the drawing, the circuit of its start solenoid winding 141 is prepared which is adapted when energized to pull the switch into its alternate position to connect the charging circuit and prepare a circuit for its stop solenoid winding 142 which is adapted to operate in the reverse manner. The conductors 155 and 156 terminate in a commercial current source of a suitable voltage, and, after the energization of the start relay 141, will be extended to the motor of the motor generator 70 by way of contacts 149, 150, movable wipers 152, 153, and contacts 146, 147 of the solenoid switch.

To the right-hand side of the drawing, I have shown the motor generator 70 together with a circuit breaker 11, an alarm signal comprising the bell 52 and the lamp 53, a battery 65, a counter cell 66, a manual switch 69 for cutting the counter-cell in and out, and two bus bars 67 and 68, the latter of which is grounded. The commercial current source is assumed to be one that delivers direct current of 110 volts, and, accordingly, I have shown a shunt wound motor. It is, however, to be understood that the current source may also be of a higher voltage or of alternating current, and that the motor will be determined by the local conditions, i. e., by the current which is available. It is, likewise, immaterial, for the purpose of explaining the invention, whether a shunt— or a compound wound generator is employed. However, a compound wound generator is preferably used for reasons hereinbefore set forth, and I have, therefore, shown the generator to be a compound machine.

Leads 71 and 72 provide for the distribution of battery from the bus bar 67 to the various points where battery is required. It is to be understood that ground is distributed similarly from the grounded bus bar 68 and that I have shown several grounds only for convenience.

A meter 12 comprising the operating magnet 13 and registering mechanism 14, is provided for registering the number of calls. The release alarm control circuit is utilized for this purpose.

The source for producing current impulses for the operation of the motor magnets 106 and 128 of the switches 100 and 120, respectively, comprises the relays 9 and 10. The contact spring 39 of the latter, normally resting against a stop 42 is provided with a weight 43. Armature 38, in response to the energization of relay 10 knocks against spring 39 and causes thereby a vibration of this contact spring, so that contact is made intermittently in rapid succession for but very short periods of times. The relay 9 which is of high impedance does not respond to these impulses produced through the vibrations of armature 38 and spring 39, but energizes after the vibrations cease, i. e., it responds only to a current impulse of sufficient duration. The operation of relay 9 causes an impulse to be transmitted to the motor magnet of the switch which happens to be in operation or to both. This impulse is transmitted by way of armature 36 and at the same time a shunt around relay 10 is closed by way of armature 37. Relay 10 de-energizes then and opens the circuit of relay 9 through armature 38. Relay 9 de-energizes thereafter and removes the shunt around relay 10, and a new cycle results. Current impulses for the operation of the motor magnets 106 and 128 of the switches 100 and 120, respectively, are produced in this manner. It will be understood that the speed of impulse production may be increased or reduced by properly adjusting the weight 43 on contact spring 39.

The relays 2, 3, 4 and 5 are provided for the control of the delay switch 100, while the relays 6, 7 and 8 control the alarm switch 120. Their operation will appear clear from the detailed description which is to follow. Resistances 54, 56, 58 and 60, as well as the condensers 55, 59 and 61 are provided for spark prevention. The purpose of resistance 57 is to insure against short circuits as can readily be seen from an examination of the drawing.

I shall now explain the operation of my invention in detail. Assume the apparatus to be in the position shown with the charging circuit opened, that is, no call is present and the motor generator is resting. Upon a subscriber removing his receiver to extend a call, certain relays will operate and ground will be connected to lead 95 over armature 96.

A circuit is now completed from battery, bus bar 67, distributing lead 71, conductor 73, relay 2, holding wire 95, armature 96, to ground. Relay 2 energizes and the armatures 15, 16, 17, 18, 19 assume their alternate positions. Armature 16 completes the connection of release main battery over relay 6 to the exchange equipment; armature 18 connects relay 3 in series to relay 2. Relay 3, however, cannot operate because of the shunt at contact 96. Armature 17 causes the energization of relay 4 by way of conductors 71, 74, winding of relay 4, armature 17, conductor 159, contact 145, brush 15, and contact 148. Armature 19 opens to prevent a premature operation of relay 5. Relay 4 is now energized and a circuit is completed for the start relay 141 of the solenoid switch 140 from battery, negative bus bar 67, distributing lead 72, start relay 141, leads 157 and 173 to ground at armature 24 of relay 4. The start relay 141 energizes and draws the bar carrying the wipers 151, 152, 153 in a direction indicated by the arrow, thereby connecting commercial current of a suitable voltage to the motor of the motor generator 70 over contacts 149, 150 and 146, 147 of the solenoid switch 140, and by means of wiper 151 which assumes its alternate position on contact 144, prepares the operation of its stop magnet, as will be explained later. Armature 23 of relay 4 is provided for locking this relay after its energization over the lead 159, to insure the proper actuation of the solenoid starting relay 141. For the same reason relay 4 is made slow acting. After the operation of the starting relay 141 is accomplished, relay 4 de-energizes again and remains inert.

The generator is operating now, charging the battery and carrying the switchboard load as long as a call is present. Circuit breaker 11 energizes over its upper winding in response to the proper operation of the generator, thereby opening its armature 40 so that no alarm signal is given. In case of machine failure, however, 11 remains inactive and the signal operates. Switch 69 will then be closed manually, shunting the counter-cell 66, and the battery 65 comprising twenty-four cells of which only the first and last two cells are shown, will carry the switchboard load until the trouble is removed.

No change takes place as long as a call is present. Relay 2 is maintained energized, supplied with ground over conductor 95, from a switch used in the extension of a call, or if my invention is adopted for other service than in a telephone exchange, from a relay or similar apparatus indicating that current is required.

Under ordinary conditions as they prevail in a telephone exchange, the generator will probably be in operation all day, with a possible exception during the noon hour. Release circuits, however, will be actuated continually. I shall, therefore, describe next the operation of the means provided for signalling a faulty release circuit.

For this purpose it will be assumed that a switch, of which I have shown the release magnet 90 is about to restore. Armature 91 assumes its alternate position in response to the operation of the release relay of the switch, and completes the circuit for the release magnet 90 and for relay 6. This circuit can be traced from battery, bus bar 67, distributing lead 71, conductor 76, relay 6, conductor 167, armature 16, conductor 92, release magnet 90, to ground at armature 91. Relay 6 energizes simultaneously with the release magnet. The meter magnet 13 operates and registers the call, because of ground supplied through armature 27. Relay 8 energizes from battery, negative bus bar, distributing lead 71, conductor 79, relay 8, shunt around relay 7 over the armature 30 and contact 125 of switch 120, to ground at armature 28. Relay 8, over its armature 35 completes the circuit for the holding magnet 127. At the same time a circuit is prepared for the stepping magnet 128 of the switch 120 from battery, negative bus bar 67, distributing lead 72, stepping magnet 128, lead 131, armatures 31 and 34. conductor 169, armature 36. Another circuit completed by relay 8 concerns the impulse device. Relay 10 of this device energizes over the following circuit—battery negative bus bar 67, distributing lead 71, resistance 57, relay 10, armature 33, to ground at armature 29. Relay 7, as will be remembered, has not been energized because of the shunt around its winding. The energization of relay 10 causes the armature 38 to move quickly into its alternate position, knocking against contact spring 39 which is provided with a weight 43. This results in a vibration of spring 39 and, as has been described, ultimately in the energization of relay 9, which connects a shunt around relay 10 over armature 37, causing thereby the de-energization of relay 10, and at the same time giving a ground impulse to the stepping magnet 128, which may be traced from battery, negative bus bar 67, distributing lead 72, conductor 85, stepping magnet 128, conductor 131, armatures 31 and 34, conductor 169, impulse contact 36 to ground. The de-energization of relay 10 causes the opening of armature 38. Spring 39 is resting on stop 42 and, consequently, relay 9 falls back also, removing thereby the shunt around relay 10 which energizes again. Thus impulses are produced, and stepping magnet 128 moves the ratchet wheel 121 in the direction indicated by the arrow. Pin 126 advances toward the contact 125. If the release circuit is not cleared. that is, if relay 6 remains energized and consequently relay 8 also, the contact 125 will be opened by the pin 126 after twelve seconds. Relay 7 energizes then in series with relay 8 because the shunt around its winding had been removed, and contact 29 completes the circuit to the release alarm circuit as may readily be seen from the drawing, and at the same time disconnects ground from the interrupter device. Armatures 31 and 32 interrupt the circuit to the holding and to the stepping magnet of switch 120, which restores its normal position, while armature 30 keeps the shunt open which otherwise would be closed again around relay 7 as soon as the switch 120 had restored.

Pin 126 is adjustable, so that the total time for operating the contact 125 may be shortened or prolonged as desired. As will be seen from the drawing, the operation of the relay 6 is made dependent from armature 16 of relay 2. This relay, however, will de-energize under the influence of the delay switch 100 in a manner to be subsequently described. If a faulty release circuit should occur late in the evening, after the attendant has left the office, release main battery will be disconnected through contact 16 a predetermined time after the last call has been made, and connected again with the first morning call, and twelve seconds afterwards the release alarm signal will be operated again and call the attention of the office attendant.

It will be assumed next that a silent period occurs—that is, that no call is being made by the subscribers. The delay switch will start to operate, and, after a certain time has elapsed the solenoid power switch will operate in a direction reverse to the arrow, to disconnect commercial current from the motor of the motor generator. Relay 2, as will be remembered, is kept energized as long as a call is present.

After the last subscriber hangs up the receiver, ground is disconnected from conductor 95. The shunt around relay 3 is removed and this relay energizes now in series with relay 2. This circuit can be followed from battery, negative bus bar 67, distributing lead 71, conductor 73, relay 2, armature 18, relay 3, to ground on contact 103 of the switch 100. Armature 20 assumes its alternate position and completes the circuit for the interrupter device from battery, negative bus bar 67, distributing lead 71, conductor 81, resistance 57, relay 10, conductors 168 and 166, armature 20, conductor 158, to ground at contact 148, over wiper 151 of the solenoid power switch 140. Wiper 151 has been positioned together with the wipers 152 and 153 through the energization of the start relay 141. Armature 22 of relay 3 connects the holding magnet 105 of the delay switch 100 from battery negative bus bar 67, distributing lead 72, holding magnet 105, conductor 110 to ground at armature 22. The holding magnet energizes, and causes engagement of the holding pawls 107 and 113 with teeth of ratchet wheels 101 and 102, to permit the motion of the two ratchet wheels 101 and 102 in a forward direction only. It will be seen from the drawing that the pawls are in normal or resting position out of engagement with ratchet wheels 101 and 102. The purpose of pawl 107 when in engagement with ratchet wheel 101 is to prevent reverse rotation of this wheel while switch 100 is in operation. The purpose of pawl 113 is merely to insure engagement of stepping pawl 108 with ratchet wheel 102 by preventing reverse rotation of wheel 102 by back drag of stepping pawl 108 when this pawl is returning to its normal position after each impulse. Therefore with the pawls 107 and 113 withdrawn from ratchet wheels 101 and 102, respectively, wheel 101 will return to rest against a stop under the influence of a restoring spring while wheel 102 will remain in the position in which it stands when switch 100 is stopped. It may be said at this point that switch 120 is similarly constructed and that the same is true of the movement and of the normal position of wheel 121 as pertains to wheel 101. Armature 21 completes the circuit for the motor magnet 106 of switch 100 from battery, negative bus bar 67, distributing lead 72, motor magnet 106, conductor 109, armature 21, conductor 171 to ground at armature 36 which is the impulse armature, actuated through the operation of the relay 9 in a manner already described.

Responsive to impulses from armature 36, the motor magnet 106 operates and advances the wheel 102 through the medium of the pawl 108 in a direction indicated by the arrow. As has been stated in connection with the description of the operation of this switch, every full rotation of the wheel 102 causes the wheel 101 to be moved by one step, thereby advancing pin 104 located on the periphery of this wheel towards contact 103. The contact 103 will be opened after the lapse of a predetermined period of time which may be adjusted either with the switch or with the weight 43 on contact spring 39 or both. Ground will thereby be removed from conductor 111 and the relays 2 and 3 deenergize. A circuit for relay 5 results which can be traced from battery, negative bus bar 67, distributing lead 71, conductor 75, relay 5, conductor 170, armatures 19 and 20, conductor 158 to ground over the contacts 144 and 148 of the solenoid power switch 140. Relay 5 locks itself over conductor 158 and its own armature 25, while armature 26 connects ground to conductor 172 which terminates in the winding of the stop magnet 142 of the solenoid switch 140. The stop magnet 142 energizes now and draws the bar 154, carrying the wipers 151, 152, 153, back into the original position shown in the drawing. Commercial current is thereby disconnected from the motor of the motor-generator. Armatures 21 and 22 of relay 3 have been opened also, disconnecting the holding and the motor magnet of the delay switch 100 which restores its normal position. Armature 16 of relay 2 has likewise been opened, and disconnected main battery from conductor 92, leading to the exchange equipment.

A call originated by a subscriber would again operate relay 2 and cause the operation of the solenoid switch 140 as usual. If a call were initiated by a subscriber while the delay switch 100 is in operation, in other words if a silent period were interrupted by a demand for current, ground, applied to the lead 95 would shunt relay 3 and cause its de-energization, while relay 2 would remain energized. The switching over of armatures 20, 21 and 22 to their normal positions would cause the disconnection of the interrupter device and of the magnets 105 and 106 of the delay switch 100, and the switch would restore to its normal position.

It will be apparent from the above description that I have designed a useful invention, simple in its operation and convenient in application, which lends itself to a variety of modifications. It is to be understood, therefore, that I do not want to be limited to the form illustrated and described, but what I consider to be new and desire to have protected by Letters Patent shall be pointed out in the following claims.

I claim:

1. In combination, a storage battery provided for an equipment which intermittently draws current from said battery, there being periods of times of variable duration during which no current is required, charging means for said battery, a switching device for the connection of said charging means and for its disconnection during periods in which no current is required, a plurality of electrically operated apparatus including a stepping device for automatically delaying the operation of said switching device, and means at said stepping device for advancing an adjustable member towards a stationary contact and to operate said contact after the lapse of a predetermined time to operate said switching device.

2. In combination, a storage battery provided for an equipment which intermittently draws current from said battery, there being periods of times of variable duration during which no current is required, charging means for said battery, a switching device for the connection of said charging means and for its disconnection during periods in which no current is required, a timing switch for automatically delaying the operation of said switching device for a predetermined period after the demand for current ceases, said timing switch being provided with a set of gear wheels and a stationary contact, and means to operate said contact after the lapse of a predetermined time to operate said switching device.

3. In combination, a storage battery provided for an equipment which intermittently draws current from said battery, there being periods of times of variable duration during which no current is required, charging means for said battery, a switching device for the connection of said charging means and for its disconnection during periods in which no current is required, a timing device for automatically delaying the operation of said switching device, said timing device comprising a stationary contact and a movable member mounted on a gear wheel, a second gear wheel operating the first, and means for varying the total time required to advance said movable member towards said stationary contact without varying the speed of said second gear wheel.

4. In combination, a storage battery provided for an equipment which intermittently draws current from said battery, there being silent periods of times during which no current is required, charging means for said battery, a switching device for connecting said charging means without delay when current is required and for disconnecting the charging means after the lapse of a certain period of time when the demand for current ceases, a stepping switch for automatically delaying the operation of said switching device, having a movable member and a stationary contact, an impulse device for the operation of said stepping switch, said impulse device producing impulses at a certain rate, and means at said stepping switch to advance said movable member at another rate.

5. In combination, a storage battery provided for an equipment which intermittently draws current from said battery, there being silent periods of times during which no current is required, charging means for said battery, a switching device for connecting said charging means without delay when current is required and for disconnecting the charging means after the lapse of a certain period of time when the demand for current ceases, electrically operable apparatus for the control of said switching device having provisions to variably adjust the time period according to the requirements, and provisions to stop the operation of said controlling means and to restore it to its original position when said silent period is interrupted by a demand for current.

6. In combination, a storage battery provided for an equipment which intermittently draws current from said battery, a switching device for the connection and disconnection of battery for certain magnets of said equipment, said connection being normally open, and means for automatically closing said connection when current is required and for disconnecting battery from said magnets a predetermined time after the demand for current ceases.

7. In combination, a storage battery provided for an equipment which intermittently draws current from said battery, a generator adapted to operate in parallel with said battery, means for automatically starting the operation of said generator and conveying current from said battery to certain magnets of said equipment when current is required, and means for automatically stopping the operation of the generator and disconnecting said battery from said magnets a predetermined time after the need for current has ceased.

8. In combination, a storage battery provided for an equipment which intermittently draws current from said battery, there being silent periods of time during which no current is required, charging means for said battery, a switching device for connecting said charging means and for completing a connection in the current supply circuit of said equipment without delay when current is required and for disconnecting said charging means and opening the connection of said current supply circuit after the lapse of a certain period of time when the demand for current ceases, and electrically operable apparatus having provisions to variably adjust the time period according to the requirements.

9. In a telephone system, a storage battery, a stepping device, a switching device for the connection and the disconnection of battery for certain magnets, said connection being normally open, means for operating said switching device to close said connection when current is required, and means including said stepping for again operating said switching device to disconnect battery from said magnets a predetermined time after the demand for current ceases.

10. In a telephone system, a storage battery, a switching device for the connection and disconnection of battery for certain magnets, said connection being normally open, means for operating said switching device to close said connection immediately upon a subscriber initiating a call, and different means for again operating said switching device to disconnect battery from said magnets a predetermined time after the last call is finished provided no other call is present.

11. In a telephone system, a storage battery, a generator adapted to operate in parallel with said battery, means for automatically starting the operation of said generator and conveying current from said battery to certain magnets immediately upon a subscriber initiating a call, and means for automatically stopping the operation of the generator and disconnecting battery from said magnets a predetermined time after the last call is finished and no other call is present.

12. In a telephone system, a storage battery, a switching device for the connection and disconnection of battery for certain magnets, said connection being normally open, means for operating said switching device to close said connection upon a subscriber initiating a call, and different means for again operating said switching device to disconnect battery from said magnets a predetermined time after the last call is finished.

13. In a telephone system having means for operating and releasing equipment employed in establishing telephonic connections, a storage battery, a stepping device, means for operating said stepping device upon the releasing of said equipment by the first mentioned means, a switching device for the connection and the disconnection of battery for certain magnets, means for operating said switching device to close said connection immediately upon a subscriber initiating a call, and different means including said stepping device to operate said switching device to disconnect battery from said magnets a predetermined time after the last call is finished.

In witness whereof, I hereunto subscribe my name this 11th day of December, A. D., 1924.

MARTIN L. NELSON.